United States Patent Office 2,857,288
Patented Oct. 21, 1958

2,857,288

METHOD TO PRODUCE ADHESIVE

Philipp Albrecht and Franz Pelikan, Marktredwitz, Upper Franconia, Germany

No Drawing. Application May 10, 1955
Serial No. 507,464

Claims priority, application Germany May 11, 1954

9 Claims. (Cl. 106—123)

It is well known that material to cover solid floors in newly erected buildings within the building process, which is being brought upon the respective parts of the building (solid floors) and which floors are not completely dry (still soaken with moisture) cannot be cemented by the adhesive products with perfect sureness, as long as these parts (floors or walls) are not completely dry (due to having been exposed to fresh air not long enough). All known brands of adhesive are made partly on a basis of artificial-resin, partly on a basis of natural-resin oil varnish, or on the basis of lignosulfonates.

It is in the nature of the adhesive products that they refuse moisture (such products as artificial-resin-and/or natural-resin oil varnish products) and that they do not stick to moist underground or will be dissolved by moisture like the adhesives made on a basis of lignosulfonate. Due to the fact that a certain time has to be granted to permit the buildings to dry out by natural process (being exposed to fresh air) there are subsequently, especially during the cooler parts of the year, considerable delays in finishing buildings (apartments).

Object of the invention submitted herewith is a procedure to produce an adhesive which excludes with certainty the aforementioned defects, that is, this invention concerns an adhesive product which does not harden by drying out, but can be applied to still moist parts of the building.

Its qualities are such that:

(1) An immediate and good adherence of the laid-out material is obtained;

(2) The material laid out still sticks on during the hardening process and does not work off like it does with the aforementioned products as used heretofore;

(3) Tensions, active in the upper layers of covering materials still later-on will be intercepted by our adhesive due to its plastic nature; it will not shrink or become brittle.

The adhesive of this invention can, by very careful handling of the doses of several components, be produced in the following way:

The well-known formation by gelation, which will be obtained if lignosulfonate or ligno-containing materials and hexavalent chromium compounds in certain proportions are mixed together in a wet condition, will be used. The hexavalent chromium compounds to be considered are $Na_2Cr_2O_7$, $K_2Cr_2O_7$, $(NH_4)_2Cr_2O_7$, and $CrO_3$. This gelation takes place independent from a drying process, that is contrary to the hardening of other adhesive used up to now. The gelation thus obtained does not yet have the immediate strength of sticking-power which is a necessarily demanded factor for many floor-covering-materials that need cementing on to floors. It is a fact that all materials to cover floors, such as parquetry, hard-fibre plates, also linoleum, asphalt tiles, are sensitive to moisture and tend to swell on the side where they touch the adhesive, they distort and expand, they warp. If you add plaster to the aforementioned mixture, there will be the immediate result that a recognizeable degree of sticking-power is obtained. This effect is still improved, if to such a mixture, besides semi-hydrate plaster, highly colloid materials, such as kaolin and clay substances are added. A furthermore necessary addition is a so-called "softener," for instance: glycerine. It is easy to demonstrate, that, if one of these aforementioned ingredients is left aside, immediately the sticking-power of the adhesive that must be required, will deteriorate. The rubber-like nature of the adhesive, even if it is moist, and its insensibility to moisture after the hardening, are remarkable qualities of the new adhesive. It seems to be a fact that glycerine in this connection not only is a softener means to stop cracking of the hardened adhesive but assists the formation of a gel between lignosulfonates and the hexavalent chromium compounds. The intensive degree of sticking-power of the adhesive of the invention is not simply to be expected. It is achieved by the addition of the filling material like plaster and binding-clay or kaolin. This effect is explained as follows: Due to absorption of the water of crystallization, necessary for hardening of the plaster, the plaster takes away from the adhesive mixture a considerable part of the water used for mixing. (There are approximately 20 weight-parts of water to 100 weight-parts of plaster.) This water, deprived from the mixture, will not be free even after hardening, since it represents bound water of crystallization within the plaster. Added to this is the fact that the highly colloid kaolin or binding-clay, which has been given to the mixture as a further addition, holds certain quantities of water by capillary effects and thus, the gel formed by lignosulfonate during the rapidly going-on hardening process, and the adhesive mixture shows no tendency to give parts of the water used for mixture to the covering material or to the underground. Added as a further factor is the character of the lignosulfonate to retain water through its own hygroscopicity. As very useful for the production of such an adhesive the following mixture has been found:

10 weight-parts of lignin containing substances;
10 to 12 weight-parts of plaster of Paris, semi-hydrate $(CaSO_4 \cdot \frac{1}{2} H_2O)$;
8 to 10 weight-parts of kaolin or windsifted binding-clay;
2 to 2.2 weight-parts of sodium dichromate;
3 to 4 weight-parts of glycerine of 31° Bé.

With such a mixture, but omitting the glycerine, one can, by lengthening strongly with plaster or fine building sand and/or other suitable mineral additions, produce a product, which is very useful as pavement equalizer for none-plain solid rough floors (concrete) and also very useful for the fact that besides good adherence it has the fine quality not to need much water for making the mixture and hardens within approx. 6 hours, depending on the grade of dose. By this special quality, upon such an equalizing layer, you can, with the help of our new adhesive, cement floor-laying materials without difficulties right after the hardening of the pavement. This is a very great advantage against the materials used up to now for such purposes, that is: plaster, concrete and others, since they demand day-long drying out for the hardening process as such, before one can lay out the moisture-sensitive materials (such as linoleum, parquetry etc. for instance). The aforesaid makes it cogently clear that no more water should be brought into the adhesive mixture, than is absolutely necessary for its hardening process, and/or for the consistence of the mixture itself. For this reason it is preferable to take lignosulfonate in dry form instead of the lignin-containing liquor, also for the reason that this dry mixture permits the production of a dry mixture that contains already all ingredients of the adhesive, with the exception of the water-glycerine-mixture. It is also possible to work with concentrated lignosulfonate, to which doses of glycerine have been added, and to add the powder as a mixture with dosed plaster, wind-sifted binding-clay and the hexavalent chromium compounds.

In further extension of the invention there will be used other water soluble "softeners" than glycerine for producing an adhesive of the prescribed kind of cement floor-covering-materials, for instance:

(a) The solid hexavalent alcohol "Sorbit" which is sugarlike or alcohol-like with 6 C-atoms and 6 OH groups in its molecule, is internationally called "sorbit" and is manufactured from maize (Indian corn) and/or (b) Glycol and/or its derivates, for inst.: triglycol and/or (c) Polyethylene oxide (Carbowax), or water soluble softeners of other kinds, that are: salts which absorb water (for inst.: magnesium chloride and/or calcium chloride). The softener, soluble in water, can be replaced by emulsions of material applicable as "softeners" which are not soluble in water, to which an emulsifier is to be added.

With the firstly prescribed procedure, all components of the mixture must be kept separate until shortly before the mixture will be applied, if dry lignosulfonate shall be used instead of the lignosulfonate liquor. In this case, more than two starting products have to be used, that are: lignosulfonate powder, a solution of hexavalent chromium compounds, water-retaining additions and capillary water-retaining highly colloidal additions, as well as glycerine.

Glycerine and other alcohols are deteriorated by solutions of dichromate, therefore, we are unable to add these to the dichromate solution and keep them in stock in this form.

Glycerine on the other hand as liquor cannot be added to the powder mixture.

It would require greatest attention by the customer, if all parts of the unmixed components would have to be dosed and mixed shortly before application of the adhesive.

The task set as basis for the extension of the invention has several roots.

On one hand we endeavor to simplify the dosing of the components when mixing the adhesive and to keep only two starting products in stock.

On the other hand we endeavor to make these starting products as stable as is possible and to improve the method of regulating the time of hardening, especially for the cooler parts of the year, because of the fact, that during the colder periods of the year all chemical processes are more slowly, and/or to prevent from too fast a hardening process during the warm periods of the year, that is: to have the process go slower during these months.

If instead of glycerine, the hexavalent alcohol "Sorbit" in dry form is used, one can add this to the cement-powder right away, thus enabling the producer to work with only two starting-products in stock.

If one takes lignosulfonate liquor instead of the lignosulfonate powder, one cannot add water-binding additions because they would harden before the adhesive is used.

One would have to work with three (3) components in such a case also. These are: the lignosulfonate liquor with added "softeners," the water-retaining additions (powder) and a solution of dischromate.

Polyethylene oxide otherwise not used as "softener," may be, since it is to be had in dry scaled form, added to the adhesive-powder-mixture right from the beginning and can be kept in stock. It also can be—and this is of more usefulness—added to the solution of dichromate, in which it will not be destroyed contrary to glycerine and other hexavalent alcohols.

The application of a "softener" to a solution of dichromate, which will not be destroyed by dichromate, is therefore extremely important, because of the fact that "softeners" do delay the hardening process, so that one would have to enlarge the part of dichromate in the adhesive mixture, if the desirable and demanded very short hardening time is to be achieved.

An overdose of dichromate necessary to achieve a very short time for hardening of the mixture will, after saturation of the lignosulfonate substances, hurt the "softeners" and even deteriorate them partly, thus having the effect of making the purpose of the "softener" a very questionable point.

The purpose will not be achieved and the adhesive will be brittle.

If such deteriorations of the "softener" occur, the end-product is not firmly in the hands of the producer. The special advantage of the oxide wax, contrary to the afore-stated, is that it will not be hurt even by an overdose of dichromate, thus keeping up with the requirements for a "softener" and prevent brittling of the adhesive.

Due to this fact, doses can be adequately adapted to the different temperatures and moisture-conditions of the various periods of the year to such an extent that the demanded and required short time of hardening will be achieved and only two products have to be kept in stock, namely: the solution of dichromate on one hand and a stable adhesive-powder-mixture on the other hand, when the "softener" is of such nature, that it is not deteriorable by solution of dichromate and can be either added to the solution of dichromate, or, as far as it is to be had in dry form, can be added to the adhesive-powder mixture.

The employment of such a "softener" is also applicable in case of use of lignosulfonate liquor.

In all cases it will be possible to obtain such tight connections between floor-covering-materials and the respective undergrounds with the adhesive after the invention, that, if one will pull off the material, the layer of adhesive will not be destroyed or dissolved, but will stick on to the material, that means: the cemented layer of the material (with linoleum for instance) will work off from their neighbouring layers of material, but not from the adhesive after invention.

The adhesive, of a light milky-chocolate-brown in the beginning, changes to a dark-brown and very dark-brown even within the procedure of hardening and with this change of color it is evident and announced in a clear way after application of the adhesive that its condition is ripe enough to start with sureness with the cementing of asphalt tiles and other laying of plates.

Calcium chloride, still more the magnesium chloride, accelerate the hardening process of our adhesive mixture in contract to other "softeners," so that we may say that the application is especially of advantage, if temperatures are low.

One can take less dichromate then and still achieve short hardening times. This fact on the other hand permits also for a certain short hardening time when having other temperatures, to apply other "softeners" in addition, which "softeners" otherwise would be hurt due to the higher demand of dichromate. These salts, such as magnesium chloride and calcium chloride, drawing water, do have, besides the fact that they work as a "softener," another certain chemical effect, accelerating the process of hardening of the adhesive after invention. As other none-water-soluble materials, acting as "softeners" of which one can make liquid emulsions, which then serve as "softener" are stated: mineral oil, ceresin, soft paraffin, asphalt, tar, and the well known mixture of "resin-soaps" called adhesive wax.

As emulsifying materials, which act as solution-medium or distributor-medium, may be stated for instance the xylol - sulphonic sodium or other wetting agents (spreaders), for instance, the derivatives of naphthalene-sulphonic salts.

These emulsions also will not be hurt even in dichromate solutions with a high content of dichromate. It is known that the lignosulfonate gelatinizing with hexavalent chromium compounds, become almost water-insoluble and water-insoluble respectively only in acid reactions. With neutral and alkali reaction this is not the case.

If one cuts down the part of dichromate in its proportions to the parts of lignosulfonate-dry-substances, there will be achieved a water-insolubility of the gel formed if the pH of the adhesive-mixture is cut down by adding of acids or acid salts, as for instance aluminum sulphate.

What is claimed is:

1. A method of preparing an adhesive or cement for floor coverings, comprising mixing a lignosulphonate with hexavalent chromium compounds and water and a water binding addition to absorb a part of the water as water of crystallization and to hold a part of the water in excess, and adding to the mixture an aqueous-glycerine substance and immediately applying the adhesive.

2. A method of preparing an adhesive or cement for floor coverings, comprising mixing a lignosulphonate with hexavalent chromium compounds and water and a water binding addition to absorb a part of the water as water of crystallization and to hold a part of the water in excess, and adding to the mixture a multivalent alcohol substance and immediately applying the adhesive.

3. A method of preparing an adhesive or cement for floor coverings, comprising mixing a lignosulphonate with hexavalent chromium compounds and water and a water binding addition to absorb a part of the water as water of crystallization and to hold a part of the water in excess, and adding to the mixture a glycol substance and immediately applying the adhesive.

4. A method of preparing an adhesive or cement for floor coverings, comprising mixing a lignosulphonate with hexavalent chromium compounds and water and a water binding addition to absorb a part of the water as water of crystallization and to hold a part of the water in excess, and adding to the mixture a polyethylene oxide substance and immediately applying the adhesive.

5. A method of preparing an adhesive or cement for floor coverings, comprising mixing a lignosulphonate with hexavalent chromium compounds and water and a water binding addition to absorb the water as water of crystallization and to hold a part of the water in excess, and adding to the mixture a hygroscopic salt substance selected from the group consisting of magnesium chloride and calcium chloride and immediately applying the adhesive.

6. A method of preparing an adhesive or cement for floor coverings, comprising mixing a lignosulphonate with hexavalent chromium compounds and water and a water binding addition to absorb a part of the water as water of crystallization and to hold a part of the water in excess, and adding to the mixture an emulsion formed from a number of substances selected from the group consisting of a mineral oil, ceresin, paraffine, asphalt, tar, resin and wax.

7. A method according to claim 1, in which aluminum sulphate with acids and acid salts is added to the mixture to reduce the pH to below 6.

8. An adhesive or cement for fastening floor coverings particularly linoleum consisting of 10 parts lignosulphonate, 10 to 12 parts plaster, 8 to 10 parts kaolin, 2 to 2.2 parts sodium dichromate, 3 to 4 parts of a water soluble softener selected from the group consisting of glycerine, polyethylene oxide, hexahydric alcohol and glycol, and 4 to 5 parts water, the parts of the substances being by weight.

9. An adhesive or cement for fastening floor coverings particularly linoleum consisting of 10 parts lignosulphonate, 10 to 12 parts plaster, 8 to 10 parts wind-sifted binding clay, 2 to 2.2 parts sodium dichromate, 3 to 4 parts of a water soluble softener selected from the group consisting of glycerine, polyethylene oxide, hexahydric alcohol and glycol, and 4 to 5 parts water, the parts of the substances being by weight.

References Cited in the file of this patent

UNITED STATES PATENTS

| | | |
|---|---|---|
| 1,143,714 | Knight | June 22, 1915 |
| 1,422,483 | Schumacher | July 11, 1922 |
| 1,878,828 | Cross | Sept. 20, 1932 |
| 2,542,344 | Mersereau | Feb. 20, 1951 |
| 2,662,025 | Keene | Dec. 8, 1953 |